United States Patent
Clinton et al.

(10) Patent No.: US 9,551,141 B2
(45) Date of Patent: Jan. 24, 2017

(54) DRAIN BODY SEAL AND PROTECTION SYSTEM AND METHOD

(71) Applicants: Justin David Clinton, Orange, CA (US); Jason Erik Tendler, West Hills, CA (US)

(72) Inventors: Justin David Clinton, Orange, CA (US); Jason Erik Tendler, West Hills, CA (US)

(*) Notice: Subject to any disclaimer, the term of this patent is extended or adjusted under 35 U.S.C. 154(b) by 0 days.

(21) Appl. No.: 14/709,233

(22) Filed: May 11, 2015

(65) Prior Publication Data

US 2016/0333565 A1 Nov. 17, 2016

(51) Int. Cl.
*E03F 5/04* (2006.01)
*F16L 57/00* (2006.01)
*E02D 29/14* (2006.01)

(52) U.S. Cl.
CPC .............. *E03F 5/0411* (2013.01); *E03F 5/041* (2013.01); *F16L 57/005* (2013.01); *E02D 29/149* (2013.01)

(58) Field of Classification Search
CPC ...... E03F 5/0407; E03F 5/0409; E03F 5/0411; E03F 5/384; E03F 5/041; E03F 2005/0416; F16L 57/005; E02D 29/149; E02D 29/14; Y10T 137/6988
USPC ........ 52/20, DIG. 12; 405/25; 137/362, 377, 137/381; 138/89.1, 90, 96 R
See application file for complete search history.

(56) References Cited

U.S. PATENT DOCUMENTS

| 969,776 | A | * | 9/1910 | Foley | E03B 9/10 137/371 |
|---|---|---|---|---|---|
| 1,232,789 | A | * | 7/1917 | Gibson | 137/362 |
| 1,859,739 | A | * | 5/1932 | Keating | E02D 29/14 404/25 |
| 3,040,895 | A | * | 6/1962 | Sisk | E03F 5/0407 210/164 |
| 3,046,853 | A | * | 7/1962 | Legendre | E02D 29/14 220/284 |
| 3,173,443 | A | * | 3/1965 | Saville | E03F 5/042 137/362 |
| 3,362,425 | A | * | 1/1968 | Morris | E03F 5/02 137/362 |
| 3,445,973 | A | * | 5/1969 | Stone | E03F 5/0407 210/163 |
| 4,233,697 | A | * | 11/1980 | Cornwall | E03D 11/16 138/89 |
| 4,257,892 | A | * | 3/1981 | Boersma | E03F 5/0407 210/163 |

(Continued)

*Primary Examiner* — Robert Canfield
(74) *Attorney, Agent, or Firm* — Michael Carwin; Kleinberg & Lerner, LLP

(57) ABSTRACT

A seal and protection system and method for use with a drain body to protect components of the drain body from damage during construction and eliminate trip hazards to a user created by an opening of the drain body is provided. The system also permits the user to test the drain body for leaks. The system includes a gasket coupled to the drain body opening, and a circular cover coupled to the gasket and having a beveled outer edge, a top face and a bottom face, the bottom face having a plurality of inner ribs disposed thereon and radially spaced apart such that each inner rib of the plurality of inner ribs is equidistant from each adjacent inner rib. The beveled outer edge of the cover conforms to contours of the drain body and extends to enclose the opening of the drain body, thereby sealing and protecting the drain body.

6 Claims, 6 Drawing Sheets

(56) References Cited

U.S. PATENT DOCUMENTS

| | | | | |
|---|---|---|---|---|
| 4,614,065 A * | 9/1986 | Papp | E02D 29/1409 | 404/26 |
| 4,648,740 A * | 3/1987 | Carlson | E02D 29/149 | 277/641 |
| 4,823,411 A * | 4/1989 | Nettel | E03C 1/30 | 138/89 |
| 4,861,186 A * | 8/1989 | Ferns | E02D 29/14 | 404/25 |
| 4,973,191 A * | 11/1990 | Dannhauser | G09F 19/22 | 404/25 |
| 5,010,957 A * | 4/1991 | Kenner | E21B 33/03 | 137/371 |
| 5,234,029 A * | 8/1993 | Thomas | F16K 27/006 | 137/364 |
| 5,240,346 A * | 8/1993 | Yin | E02D 29/149 | 404/25 |
| 5,268,096 A * | 12/1993 | Robol | E03F 5/0407 | 210/164 |
| 5,329,971 A * | 7/1994 | Condon | E03D 11/16 | 138/89 |
| 5,404,676 A * | 4/1995 | Devlin | E02D 29/149 | 404/25 |
| 5,996,134 A * | 12/1999 | Senninger | E03D 11/16 | 138/96 R |
| 6,725,468 B2 * | 4/2004 | Molina | E03D 11/16 | 138/89 |
| 7,581,361 B1 * | 9/2009 | Murkland | E04G 21/3204 | 220/800 |
| 7,735,512 B1 * | 6/2010 | Ismert | E03F 5/0407 | 137/362 |
| 7,762,282 B2 * | 7/2010 | Coscarella | F16L 55/115 | 138/89 |
| 8,534,484 B2 * | 9/2013 | Rost | H02G 9/10 | 220/237 |
| 8,658,033 B2 * | 2/2014 | Farkas | E03F 5/04 | 210/163 |
| 8,833,387 B2 * | 9/2014 | Lucas | E03F 5/0407 | 137/362 |
| 8,875,727 B2 * | 11/2014 | Wroblewski | E03F 5/0407 | 137/15.09 |
| 9,175,797 B1 * | 11/2015 | Behoteguy | F16L 55/115 | |
| 2007/0062125 A1 * | 3/2007 | Gondou | E02D 29/14 | 52/19 |
| 2007/0215212 A1 * | 9/2007 | Demeniuk | E03F 5/042 | 137/362 |

\* cited by examiner

DRAIN BODY SEAL AND PROTECTION SYSTEM AND METHOD

BACKGROUND

The embodiments herein relate generally to drain bodies of commercial buildings.

Commercial buildings typically have a plurality of drain bodies in the floor connected to the plumbing system. During the construction of a building and/or project, the drain body and other components such as the clamp ring are exposed. This is problematic because environmental elements such as rain and snow can rust, damage and/or cause premature wear to the clamp ring or other drain body components. In addition, the exposed drain body opening presents a tripping hazard to individuals present on the construction site.

As such, there is a need in the industry for a drain body seal and protection system that protects the components of the drain body when a building is constructed and eliminates tripping hazards posed to individuals caused by the exposed drain body opening. There is a further need for a drain body seal and protection system that permits individuals to test the drain body for leaks without the need for additional components and/or expensive labor costs.

SUMMARY

A seal and protection system and method for use with a drain body to protect components of the drain body from damage during construction and eliminate trip hazards to a user created by an opening of the drain body is provided. The seal and protection system is also configured to permit the user to test the drain body for leaks. The seal and protection system comprises a gasket detachably coupled to the opening of the drain body, and a circular cover detachably coupled to the gasket and comprising a beveled outer edge, a top face and a bottom face, the bottom face comprising a plurality of inner ribs disposed thereon and radially spaced apart such that each inner rib of the plurality of inner ribs is equidistant from each adjacent inner rib, wherein the beveled outer edge of the cover conforms to contours of the drain body and extends to sufficiently enclose the opening of the drain body, thereby sealing and protecting the drain body.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
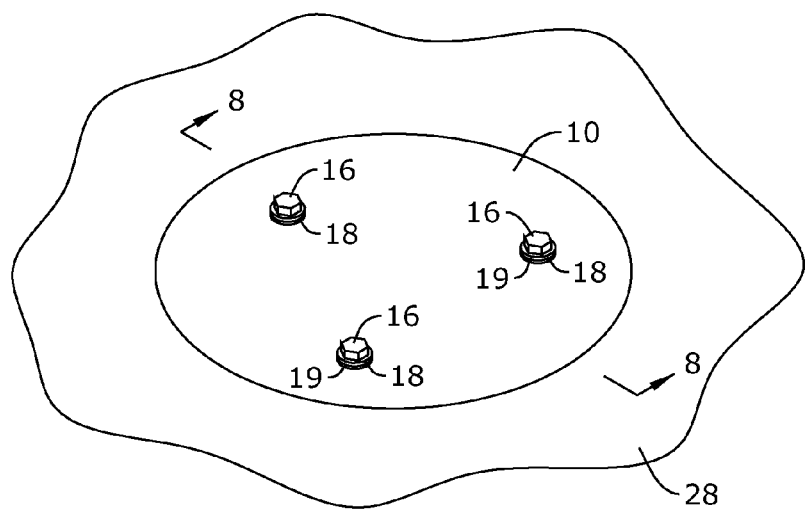
FIG. 1 depicts a perspective view of certain embodiments of the drain body seal and protection system shown in use.

As depicted in FIGS. 1-5, the drain body seal and protection system comprises drain cover 10 and gasket 20, and is configured for use with drain 24 in floor 28. Drain 24 preferably is any type known in the field used with commercial buildings. However, drain 24 can be any alternative type used with any type of building. Drain 24 comprises an opening connected to the plumbing system of a building (not shown) and drain bolt holes 26.

Figure 2:
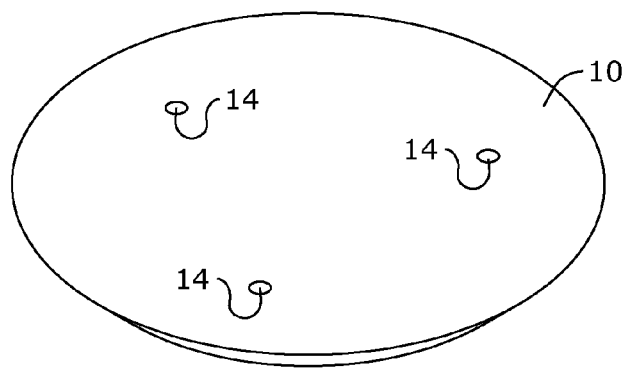
FIG. 2 depicts a top perspective view of the drain cover of the drain body seal and protection system.
Figure 3:
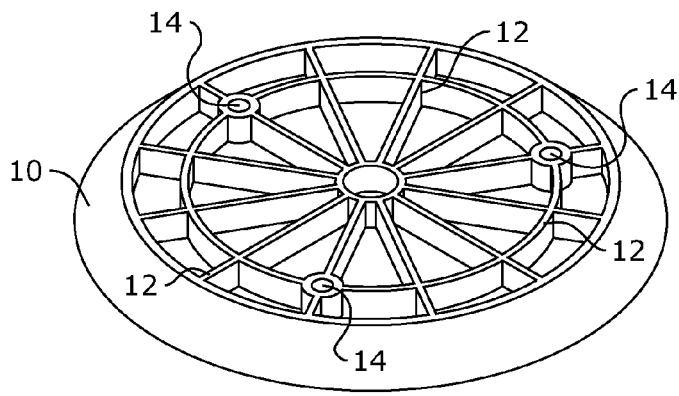
FIG. 3 depicts a bottom perspective view of the drain cover of the drain body seal and protection system.
Figure 6:
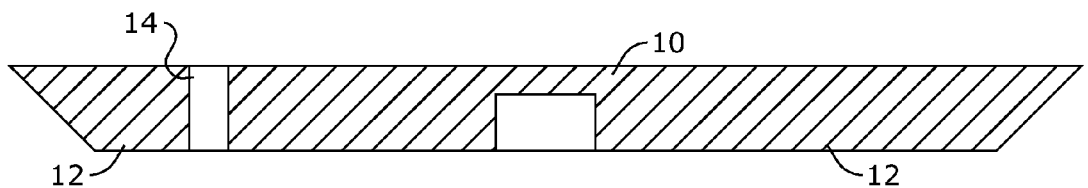
FIG. 6 depicts a section view of the drain cover of the drain body seal and protection system taken along line 6-6 in FIG. 5.
Figure 7:
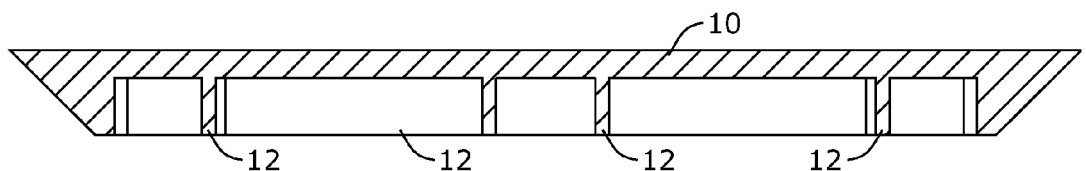
FIG. 7 depicts a section view of the drain cover of the drain body seal and protection system taken along line 7-7 in FIG. 5.

As depicted in FIGS. 2-3, drain cover 10 comprises a circular member with an outer beveled edge, inner rib section 12 and cover bolt holes 14. Inner rib section 12 comprises a plurality of ribs radially spaced apart on drain cover 10 and oriented such that each rib is equidistant from adjacent ribs. In one embodiment, inner rib section 12 also comprises one or more concentric circular members disposed on drain cover 10. FIGS. 6-7 depict sectional views of drain cover 10 illustrating the positioning of inner rib section 12 and cover bolt holes 14. Inner rib section 12 enhances the structural strength of drain cover 10 and distributes forces and/or stresses experienced evenly throughout the cover. Drain cover 10 may comprise any materials known in the field including, but not limited to, polypropylene, polyethylene, acrylonitrile butadiene styrene (ABS), or the like. Gasket 20 is configured to be disposed within drain 24 and comprises a ⅛" thick circular member comprising gasket bolt holes 22. Gasket 20 preferably is made from any material such as rubber, neoprene, silicone or other water resistant material.

Figure 4:
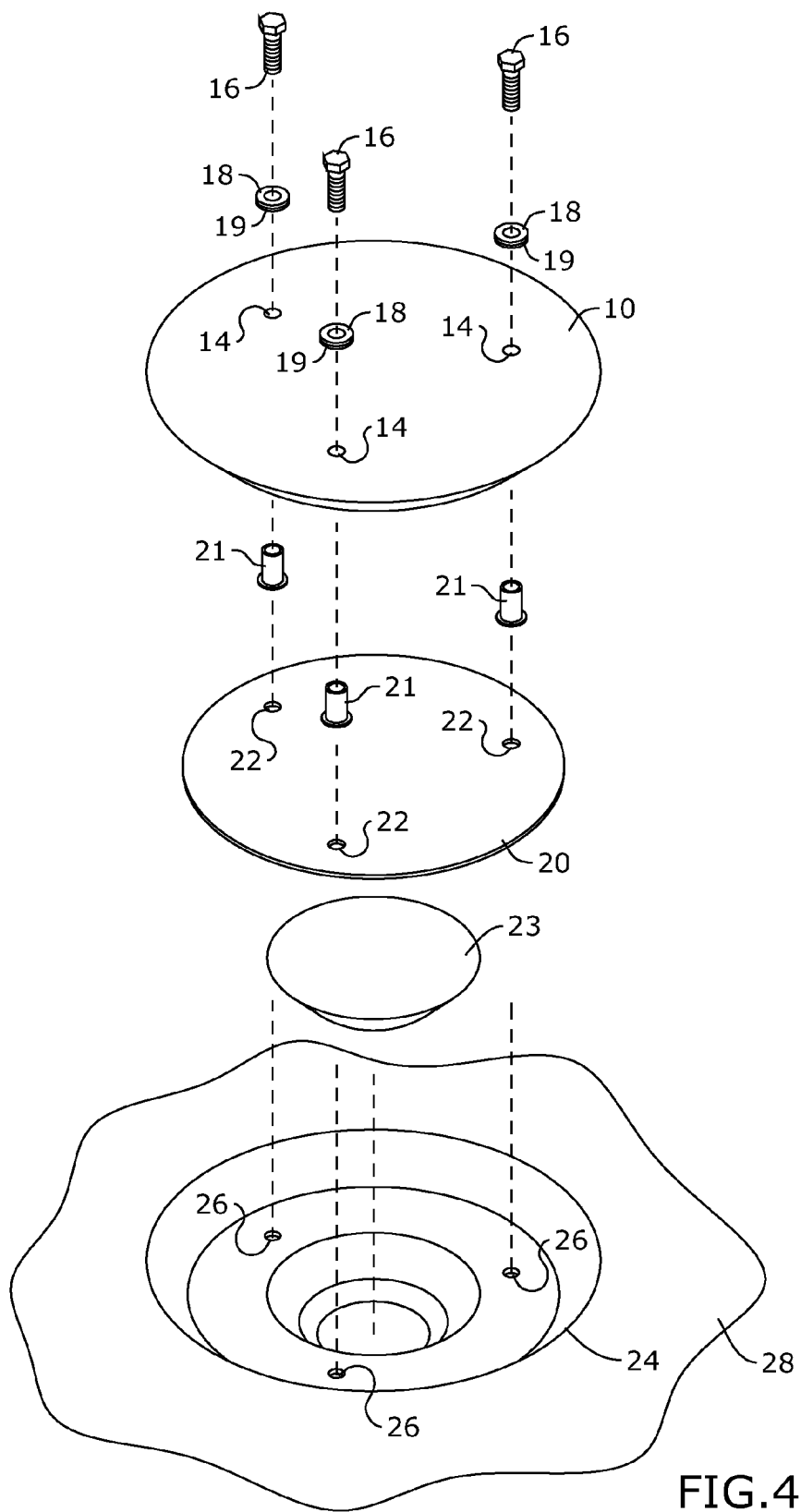
FIG. 4 depicts an exploded view of certain embodiments of the drain body seal and protection system.
Figure 5:
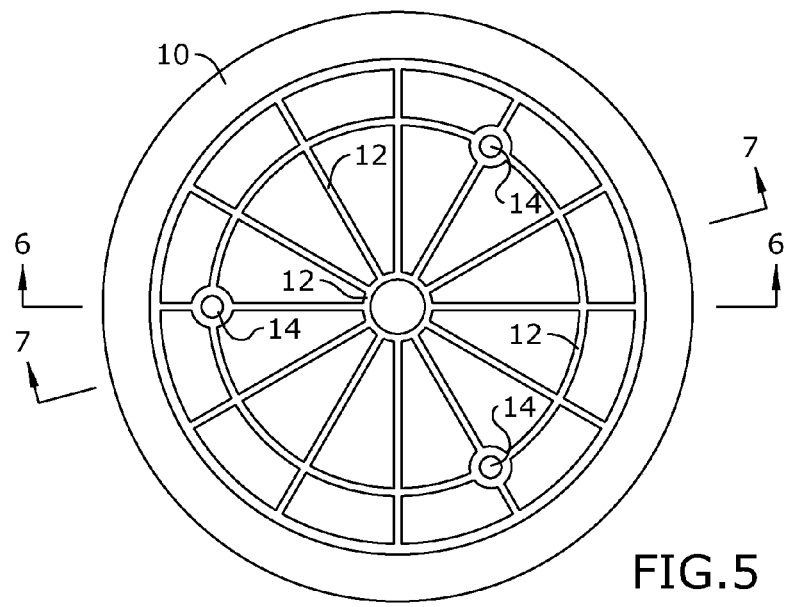
FIG. 5 depicts a bottom view of the drain cover of the drain body seal and protection system.

In operation, the drain body seal and protection system is used with drain 24 during the construction stage of a building. The clamp ring (not shown) of drain 24 is removed and stored until the building, drain and/or plumbing system is completed. As depicted in FIG. 4, the components used to seal and protect drain 24 are shown. In one embodiment, optional drain plug 23 can be disposed within the opening of drain 24. Optional drain plug 23 is generally made from rubber and comprises an outer beveled edge. Optional drain plug 23 is designed to further enhance the seal of drain 24. However, the system can also effectively be used without optional drain plug 23.

Gasket 20 is disposed within the opening of drain 24 and on top of optional drain plug 23, if used. Drain cover 10 is disposed within drain 24 and on top of gasket 20. Drain cover 10 and gasket 20 are secured to drain 24 by bolts 16 and washers comprising metallic top washer sections 18 and rubber bottom washer sections 19. Specifically, the washers are placed on top of drain cover 10 and bolts 16 are inserted through the washers, cover bolt holes 14, gasket bolt holes 22 and drain bolt holes 26. The washers are preferably ⅜" flat washers and bolts 16 are ⅜"x¼" bolts. However, alternative sized fastening components may be used instead. In one embodiment, optional rubber sleeve inserts 21 may be used and aligned with cover bolt holes 14 and gasket bolt holes 22 to aid in securing drain cover 10 and gasket 20 to drain 24.

Figure 8:
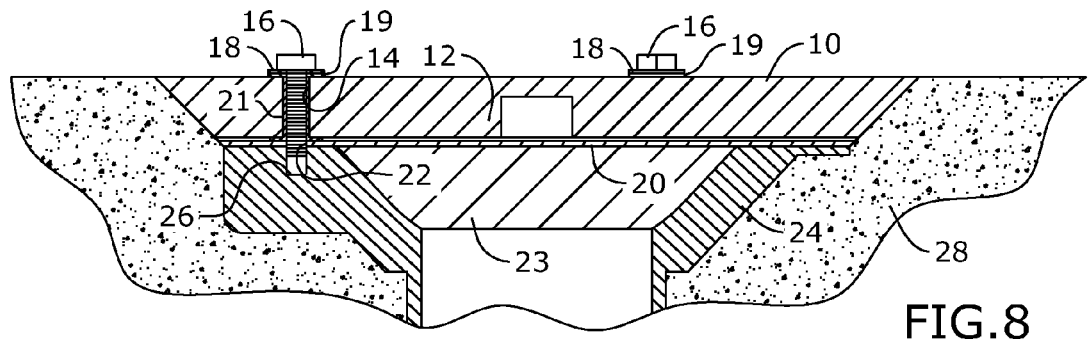
FIG. 8 depicts a section view of certain embodiments of the drain body seal and protection system taken along line 8-8 in FIG. 1.
Figure 9:
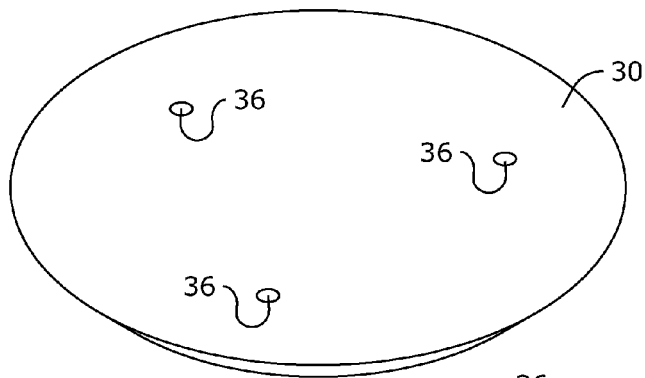
FIG. 9 depicts a top perspective view of a first alternative embodiment of the drain body seal and protection system.
Figure 10:
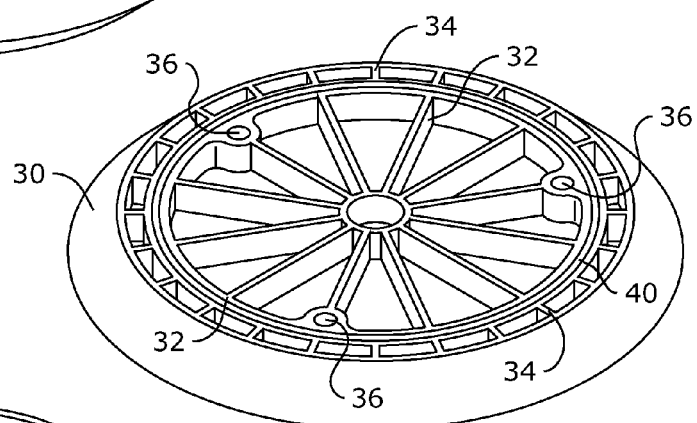
FIG. 10 depicts a bottom perspective view of the first alternative embodiment of the drain body seal and protection system.
Figure 11:
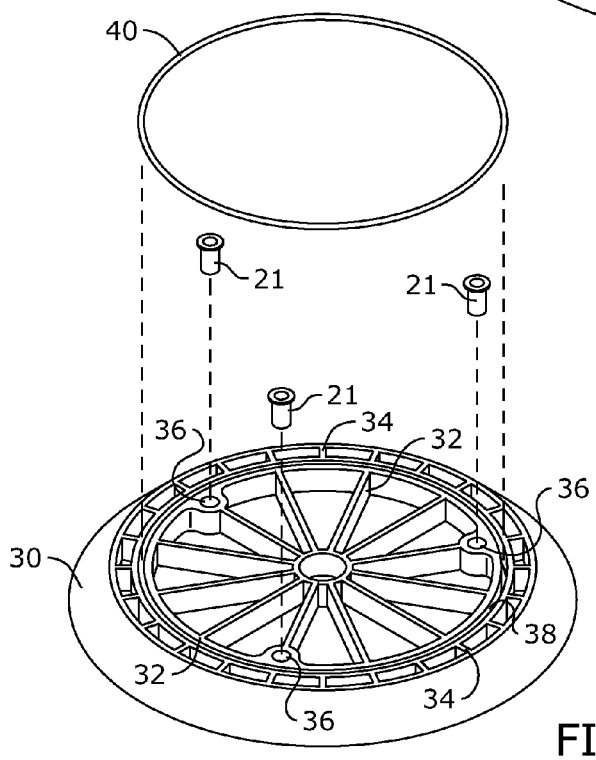
FIG. 11 depicts an exploded view of the first alternative embodiment of the drain body seal and protection system.
Figure 12:
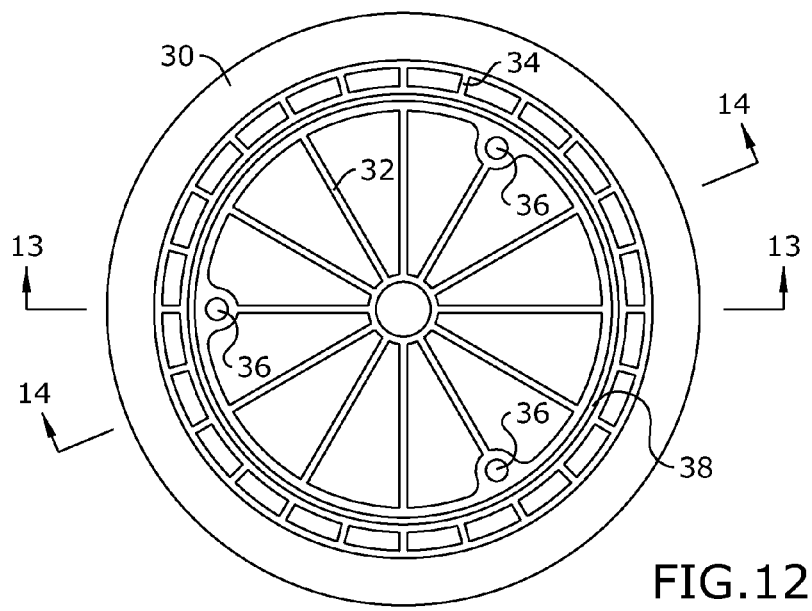
FIG. 12 depicts a bottom view of certain embodiments of the first alternative embodiment of the drain body seal and protection system.

FIG. 8 depicts a section view of drain cover 10, gasket 20 and optional drain plug 23 secured to the opening of drain 24. The beveled outer edge of drain cover 10 conforms to the contours of the drain and extends to enclose the drain body opening. In this configuration, drain 24 is protected from environmental elements during the construction stage and the drain body opening is sealed to eliminate tripping hazards to individuals present on the site. Once assembled, the drain body seal and protection system also permits users to test drain 24 for leaks by using known techniques in the field. After the building construction, drain and/or plumbing system are completed, drain cover 10, gasket 20 and optional drain plug 23 are removed from drain 24. The clamp ring (not shown) and finished cover (not shown) are placed in drain 24 and the drain body is completed.

Figure 13:
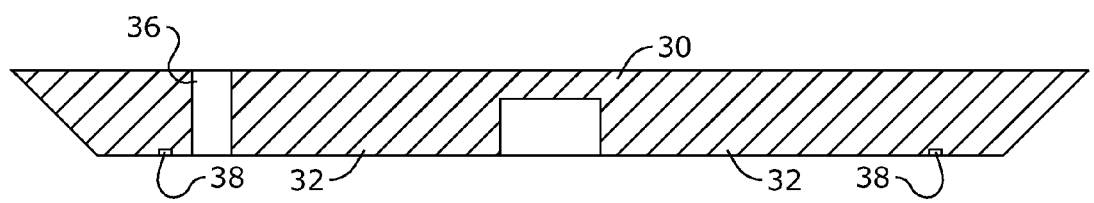
FIG. 13 depicts a section view of certain embodiments of the first alternative embodiment of the drain body seal and protection system taken along line 13-13 in FIG. 12.
Figure 14:
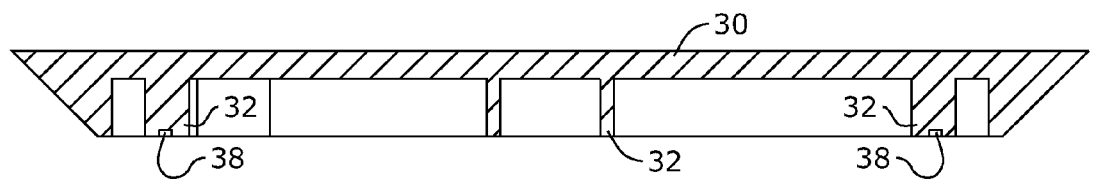
FIG. 14 depicts a section view of certain embodiments of the first alternative embodiment of the drain body seal and protection system taken along line 14-14 in FIG. 12.
Figure 15:
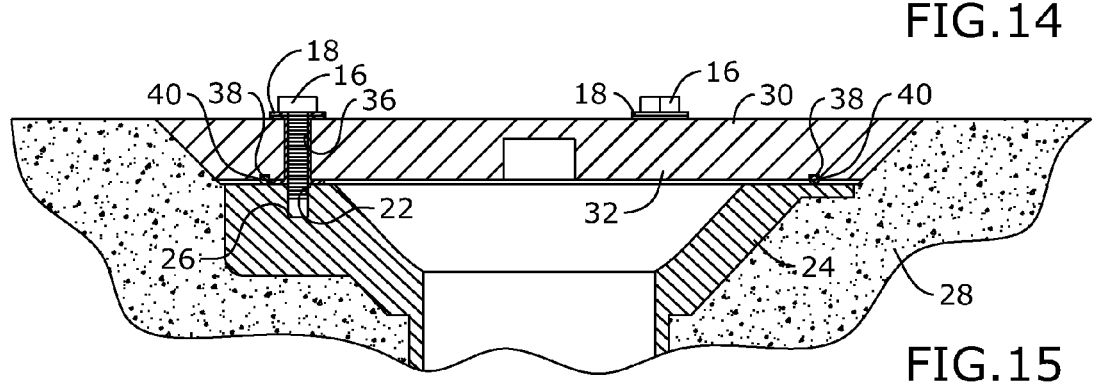
FIG. 15 depicts a section view of the first alternative embodiment of the drain body seal and protection system shown in use.

FIGS. 9-12 depict an alternative embodiment of the drain body seal and protection system comprising alternate drain cover 30. Alternate drain cover 30 comprises components substantially similar to drain body 10 such as an outer beveled edge, alternate cover bolt holes 36, inner rib section 32 and outer rib section 34. Alternate drain cover 30 further comprises circular slot 38 configured to receive O-ring 40. O-ring 40 is preferably made from rubber and is designed to improve the seal of the system and prevent water leaks of drain 24. FIGS. 13-14 depict sectional views of alternate drain cover 30 illustrating the positioning of inner rib section 32, circular slot 38 and alternate cover bolt holes 36. FIG. 15 depicts a section view of alternate drain cover 30 and gasket 20 secured to the opening of drain 24. Alternate drain cover 30 is used in substantially the same manner as described above for drain cover 10.

Figure 16:
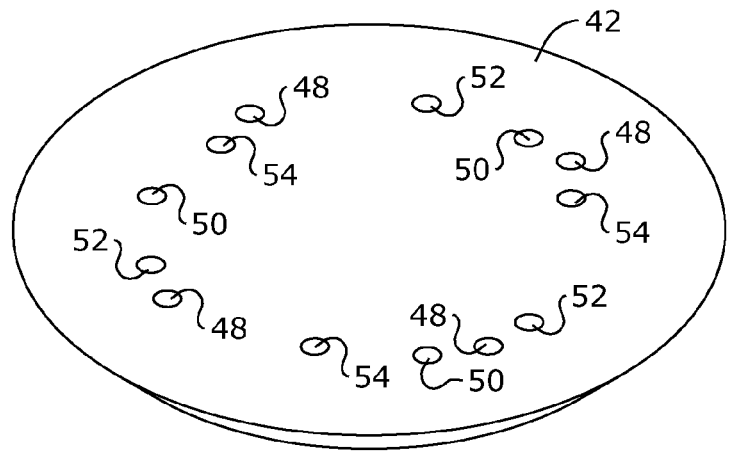
FIG. 16 depicts a top perspective view of a second alternative embodiment of the drain body seal and protection system.
Figure 17:
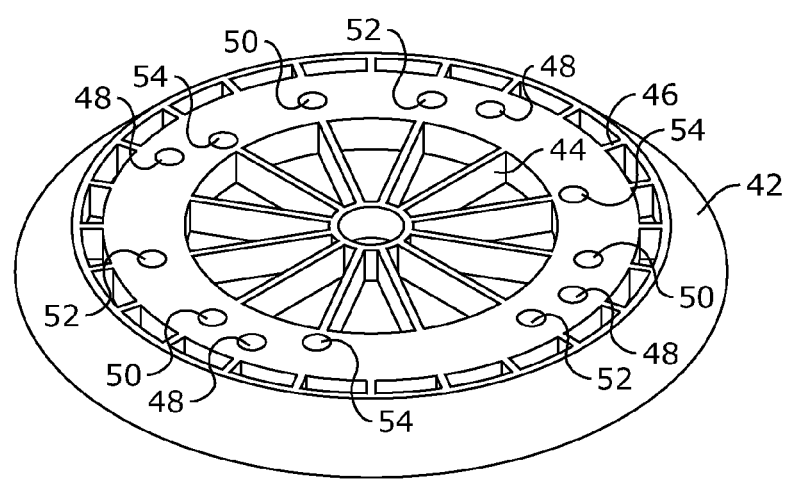
FIG. 17 depicts a bottom perspective view of the second alternative embodiment of the drain body seal and protection system.

FIGS. 16-17 depict an alternative embodiment of the drain body seal and protection system comprising alternate drain cover 42, which comprises components substantially similar to drain cover 10 and alternate drain cover 30. Alternate drain cover 42 comprises an outer beveled edge, inner rib section 44 and outer rib section 46. Alternate drain cover 42 further comprises a plurality of holes including first position bolt holes 48, second position bolt holes 50, third position bolt holes 52 and fourth position bolt holes 54. These plurality of holes enable alternate drain cover 42 to be used with a variety of drain types, models and/or manufacturers.

It shall be appreciated that the components of the drain body seal and protection system described in several embodiments herein may comprise any alternative known materials in the field and be of any color, size and/or dimensions. It shall be appreciated that the components of the drain body seal and protection system described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A seal and protection system for use with a drain body to protect components of the drain body from damage during construction and eliminate trip hazards to a user created by an opening of the drain body, the seal and protection system comprising:
    a circular cover comprising a beveled outer edge, a top face and a bottom face, the bottom face comprising a plurality of inner ribs disposed thereon and radially spaced apart such that each inner rib of the plurality of inner ribs is equidistant from each adjacent inner rib wherein the beveled outer edge of the cover extends to sufficiently enclose the opening of the drain body, thereby sealing and protecting the drain body; and
    a gasket, wherein the gasket and the circular cover are coupled to the drain body by bolts and washers.

2. The seal and protection system of claim 1, further comprising a drain plug with an outer beveled edge disposed within the opening of the drain body, wherein the drain plug is positioned beneath the gasket.

3. A seal and protection system for use with a drain body to protect components of the drain body from damage during construction and eliminate, trip hazards to a user created by an opening of the drain body, the seal and protection system comprising:
    a circular cover comprising a beveled outer edge, a top face and a bottom face, the bottom face comprising a plurality of inner ribs disposed thereon and radially spaced apart such that each inner rib of the plurality of inner ribs is equidistant from each adjacent inner rib, wherein the bottom face of the circular cover comprises a circular slot and the beveled outer edge of the cover extends to sufficiently enclose the opening of the drain body, thereby sealing and protecting the drain body.

4. The seal and protection system of claim 3, further comprising an O-ring disposed within the circular slot of the bottom face of the circular cover.

5. The seal and protection system of claim 4, wherein the bottom face of the circular cover comprises a plurality of outer ribs disposed thereon and radially spaced apart such that each outer rib of the plurality of outer ribs is equidistant from each adjacent outer rib.

6. A seal and protection method for use with a drain body to protect components of the drain body from damage during construction and eliminate trip hazards to a user created by an opening of the drain body, the seal and protection method comprising:
    disposing a drain plug with an outer beveled edge within the drain body; and
    affixing a circular cover to the drain body, wherein the circular cover comprises a beveled outer edge, a top face and a bottom face, the bottom face comprising a plurality of inner ribs disposed thereon and radially spaced apart such that each inner rib of the plurality of inner ribs is equidistant from each adjacent inner rib, wherein the beveled outer edge of the cover extends to sufficiently enclose the opening of the drain body thereby sealing and protecting the drain body.

\* \* \* \* \*